(12) United States Patent
Tseo et al.

(10) Patent No.: US 9,639,083 B2
(45) Date of Patent: May 2, 2017

(54) SYSTEM AND METHOD FOR PROGRAMMING WORKPIECE FEATURE INSPECTION OPERATIONS FOR A COORDINATE MEASURING MACHINE

(71) Applicants: Mitutoyo Corporation, Kanagawa-ken (JP); Mitutoyo Europe GmbH, Neuss (DE)

(72) Inventors: Eric Yeh-Wei Tseo, Seattle, WA (US); Dahai Yu, Redmond, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 493 days.

(21) Appl. No.: 14/133,120

(22) Filed: Dec. 18, 2013

(65) Prior Publication Data
US 2015/0169790 A1    Jun. 18, 2015

(51) Int. Cl.
*G06F 17/50* (2006.01)
*G05B 19/418* (2006.01)

(52) U.S. Cl.
CPC ......... *G05B 19/41875* (2013.01); *G05B 2219/32197* (2013.01); *G05B 2219/37193* (2013.01); *Y02P 90/22* (2015.11)

(58) Field of Classification Search
CPC .... G05B 19/41875; G05B 2219/37193; G05B 2219/32197
See application file for complete search history.

(56) References Cited

U.S. PATENT DOCUMENTS

| | | |
|---|---|---|
| 4,908,951 A | 3/1990 | Gurny |
| 5,465,221 A | 11/1995 | Merat et al. |
| 6,400,998 B1 | 6/2002 | Yamazaki et al. |
| 6,820,346 B2 | 11/2004 | Raab et al. |

(Continued)

OTHER PUBLICATIONS

Mitutoyo Corporation, "QV3DCAD-Online; CNC Vision Measuring Machine Optional Software," User's Guide, No. 99MCB506A1, MiCAT, 1st Edition Mar. 2011 (Ver. 3.000), 2nd Edition May 2011 (Ver.3.001), 206 pages.

(Continued)

*Primary Examiner* — Ryan Jarrett
(74) *Attorney, Agent, or Firm* — Seed Intellectual Property Law Group LLP

(57) ABSTRACT

A system and method are provided for programming workpiece feature inspection operations for a coordinate measuring machine. An editing environment is operated to display a 3-dimensional workpiece representation comprising a first surface feature of a workpiece. A first feature surface sampling pattern is created having at least one pattern parameter adjusted to correspond to a first surface feature of the workpiece. A corresponding representation of the sampling pattern includes operative sampling pattern locations located proximate to the first surface feature. User operations in the GUI further adjust pattern parameters of the sampling pattern. The further adjustment of the pattern parameters simultaneously affects a plurality of the sampling pattern locations. The sampling pattern representation may include various types of operative and inoperative sampling pattern locations, which may be displayed in a manner that distin- (Continued)

guishes them from one another, such as by being represented with different colors, shapes or patterns.

33 Claims, 9 Drawing Sheets

(56) References Cited

U.S. PATENT DOCUMENTS

| | | |
|---|---|---|
| 7,146,291 B2 | 12/2006 | Hough |
| 7,236,854 B2 | 6/2007 | Pretlove et al. |
| 7,508,529 B2 | 3/2009 | Gladnick et al. |
| 7,627,162 B2 | 12/2009 | Blanford et al. |
| 7,652,275 B2 | 1/2010 | Gladnick |
| 7,769,222 B2 | 8/2010 | Blanford, Jr. et al. |
| 7,783,445 B2 | 8/2010 | McLean et al. |
| 7,844,915 B2 | 11/2010 | Platzer et al. |
| 7,908,759 B2 | 3/2011 | McLean et al. |
| 8,085,295 B2 | 12/2011 | Tobiason et al. |
| 8,194,251 B2 | 6/2012 | Emtman et al. |
| 8,255,184 B2 | 8/2012 | Chang et al. |
| 8,271,895 B2 | 9/2012 | Tseo et al. |
| 8,302,321 B2 | 11/2012 | Hunter et al. |
| 8,416,196 B2 | 4/2013 | Williamson et al. |
| 8,438,746 B2 | 5/2013 | Usui |
| 2005/0038821 A1 | 2/2005 | Wallen et al. |
| 2007/0005178 A1 | 1/2007 | Prestidge et al. |
| 2007/0093930 A1 | 4/2007 | Griggs et al. |
| 2007/0250204 A1 | 10/2007 | Ould et al. |
| 2008/0024753 A1 | 1/2008 | Gladnick et al. |
| 2008/0024793 A1 | 1/2008 | Gladnick |
| 2011/0133054 A1 | 6/2011 | Campbell |
| 2011/0192042 A1 | 8/2011 | McMurtry et al. |
| 2011/0231787 A1* | 9/2011 | Tseo ............... G05B 19/409 715/771 |
| 2013/0070068 A1 | 3/2013 | Garvey, III et al. |
| 2013/0163006 A1 | 6/2013 | Sesko |

OTHER PUBLICATIONS

"Inspection Plus—software for machining centres," <<http://www.renishaw.com/en/inspection-plus-software-for-machining-centres--6094>>, viewed Aug. 9, 2013, 6 pages.

* cited by examiner

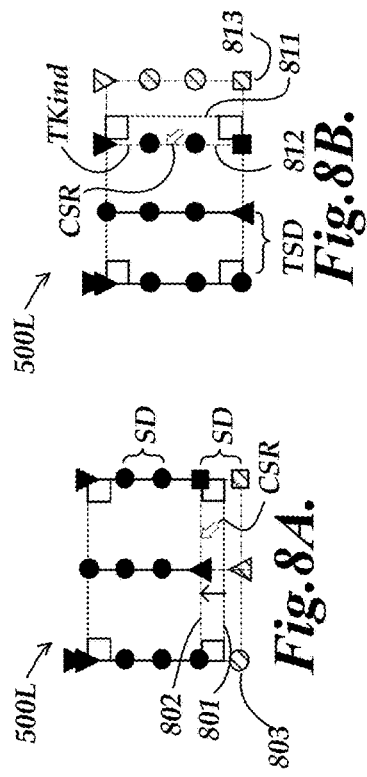
Fig. 8A.
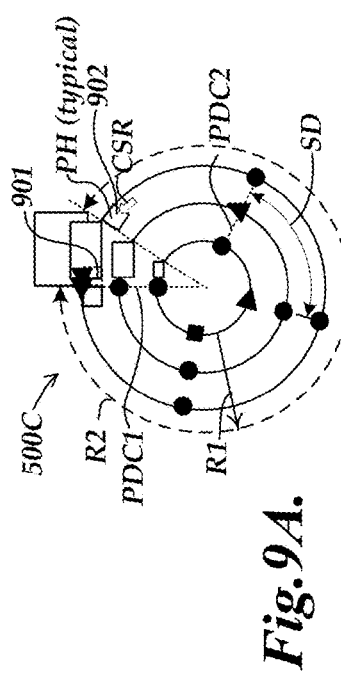
Fig. 8B.
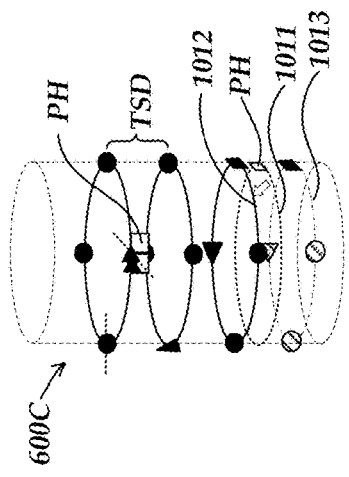
Fig. 10A.
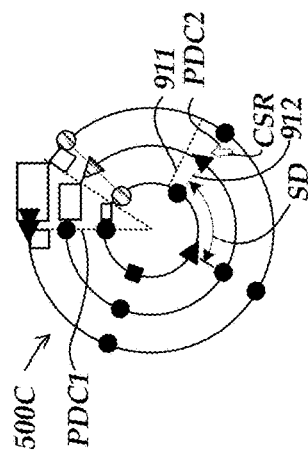
Fig. 9A.
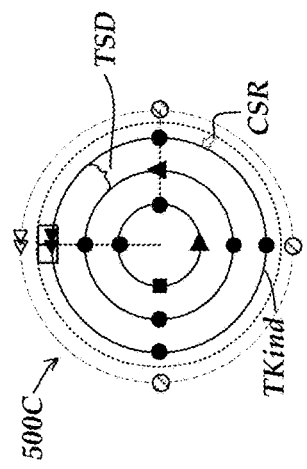
Fig. 9B.
Fig. 9C.

SYSTEM AND METHOD FOR PROGRAMMING WORKPIECE FEATURE INSPECTION OPERATIONS FOR A COORDINATE MEASURING MACHINE

TECHNICAL FIELD

The invention relates to metrology systems, and to systems and methods for programming inspection operations such as a touch probe measurement path for a coordinate measuring machine.

BACKGROUND

Certain metrology systems such as coordinate measurement systems (CMM's) can be utilized to obtain precise measurements of inspected workpieces and may be controlled at least in part by workpiece feature inspection operations that have been programmed on a computer. One exemplary prior art CMM is described in U.S. Pat. No. 8,438,746, which is hereby incorporated by reference in its entirety. As described in the '746 patent, the CMM includes a probe for measuring a workpiece, a movement mechanism for moving the probe, and a controller for controlling the movement mechanism.

A CMM which includes the service scanning probe is described in U.S. Pat. No. 7,652,275 (the '275 patent), which is hereby incorporated by reference in its entirety. After a scan, a three dimensional profile of the workpiece is provided. In one type of scanning probe, the workpiece is measured by a mechanical contact probe (e.g. a precise miniature ball) scanning along the workpiece surface.

Some CMM's use an optical probe which scans a workpiece without making physical contact with the surface. Optical probes may be of a type may use points of light for detecting surface points (such as triangulation probes), or a type that uses a video camera, wherein the coordinates of geometric elements of the workpiece are determined via image processing software.

A "combined" coordinate measuring machine that uses both optical and mechanical measuring is described in U.S. Pat. No. 4,908,951, which is hereby incorporated herein by reference in its entirety.

In all of the above described CMMs, operations may be programmed for inspecting workpiece features. For example, a measurement path may be programmed for the motion of the measurement probe during the inspection operations. However, the programming of such measurement paths and other inspection operations in existing systems is typically relatively inefficient. Some known programming methods are flexible but require labor-intensive individual inspection point adjustments by a user. Other known programming methods may use complex algorithms to automatically determine many inspection point operations, but such programming methods typically provide either limited, or complicated, methods to make adjustments to improperly programmed or undesired operations that were determined automatically. A need exists for a system and method which allow intuitive, efficient, flexible and robust programming of workpiece feature inspection operations such as for a touch probe measurement path for a coordinate measuring machine. Especially, a method is needed which is fast, efficient, flexible and understandable by relatively unskilled users.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A computer-implemented method is provided for programming workpiece feature inspection operations for a coordinate measuring machine. The coordinate measuring machine may include: a sensor used for determining workpiece feature measurement data; a stage for holding a workpiece wherein the sensor and the stage move relative to one another; and a CMM control portion. The method may be implemented in an editing environment comprising: a programming control portion; a display portion; a graphical user interface (GUI); and at least a first feature surface sampling pattern comprising an arrangement of sampling pattern locations. The programming control portion may comprise a computer and programming control routines.

In various implementations, the method includes operating the editing environment to display a 3-dimensional workpiece representation comprising a first surface feature of a workpiece on the display portion. The editing environment is further operated to create an instance of the first feature surface sampling pattern having at least one pattern parameter adjusted to correspond to the first surface feature of the workpiece, including displaying a corresponding representation of the instance of the first feature surface sampling pattern on the display portion, the corresponding representation comprising operative sampling pattern locations located proximate to the first surface feature. Sampling, as used herein, refers to a measurement "sample" (e.g. a three-dimensional surface coordinate) at a location on the surface. The instance of the first feature surface sampling pattern may comprise an element having at least one of underlying programming operations or pattern control operations. The editing environment is further operated based on user input operations in the GUI to further adjust at least one pattern parameter of the instance of the first feature surface sampling pattern. The further adjustment of the at least one pattern parameter simultaneously affects a plurality of the sampling pattern locations in the instance of the first feature surface sampling pattern. The corresponding representation of the instance of the first feature surface sampling pattern is also configured to be immediately responsive to the further adjustment of the at least one pattern parameter. In such a case, relatively unskilled user may rapidly program a set of inspection points or operations for a workpiece feature, based on immediate visual feedback allowing them to intuitively manipulate the inspection point distribution on the workpiece feature.

In various implementations, the corresponding representation may further comprise inoperative sampling pattern locations. One type of inoperative sampling pattern location may indicate that the corresponding pattern location is inaccessible by a current sensor configuration on the CMM. Another type of inoperative sampling pattern location may indicate that the corresponding pattern location does not conform to the first surface feature, such as when a pattern location falls on a void in the first surface feature or outside of the first surface feature. The display of such inoperative sampling pattern locations further enhances an unskilled user's intuitive manipulations of the sampling pattern parameters. For example, they may anticipate when operations that "contract" a pattern will move inoperative sampling pattern locations onto the workpiece feature such that they become operational. In other words, users may more rapidly and intuitively anticipate and judge useful sampling pattern adjustments and alternatives. The various types of operative and inoperative sampling pattern locations may be displayed in a manner that distinguishes them from one another, such as by being represented with different colors, shapes or patterns. A GUI element may be provided which allows a user to select whether or not to suppress (e.g. not display) at least one type of inoperative location in the corresponding representation.

In various implementations, the user input operations for adjusting the at least one pattern parameter are provided by at least one of dedicated GUI elements, touch gestures or a dialog box. In various implementations, the at least one pattern parameter that is adjusted may be related to at least one of a density of sampling pattern locations on the surface of the workpiece, or a number of sampling pattern locations in a range, or a density of sampling pattern locations along a sampling track. In some contexts herein, the sampling track is also referred to as a track, a path portion, a sampling line, or simply a line. A GUI element may also be provided which allows a user to at least one of rotate, translate or drag the instance of the first feature surface sampling pattern relative to the surface of the workpiece.

In various implementations, the instance of the first feature surface sampling pattern may comprise a graphical inspection point programming element (GIPP element) that may be selected and/or placed and/or adjusted by a user. In one implementation, the instance of the first feature surface sampling pattern may be automatically sized to and superimposed on the 3-dimensional workpiece representation when the GIPP element is moved or placed near the 3-dimensional workpiece representation in the display portion. In one implementation, the instance of the first feature surface sampling pattern may define a sampling path corresponding to inspection program instructions which are automatically generated by the GIPP element. The sampling path may be utilized for determining the movements of a surface point sensor as it is controlled by the coordinate measuring machine for sampling surface coordinates of the workpiece surface. The GIPP element may also further comprise a plurality of modes for at least one type of surface feature. In one implementation, the plurality of modes may comprise at least three modes corresponding to at least some of a plurality of sampling tracks being in the form of circles, lines or a spiral, respectively.

In various implementations, the first surface feature of the workpiece may correspond to at least one of a cylinder, plane, sphere or cone. The GIPP element may further be at least one of a cylindrical GIPP element that conforms to a cylindrical feature surface, a plane GIPP element that conforms to a planar feature surface, a sphere GIPP element that conforms to a spherical feature surface, or a cone GIPP element that conforms to a conical feature surface.

In various implementations, at least one pattern parameter may be a sampling pattern start parameter which determines a start position of the instance of the first feature surface sampling pattern. At least one pattern parameter may also be a sampling pattern first-direction path range parameter which determines a first-direction path range for the instance of the first feature surface sampling pattern, and a second corresponding pattern parameter may be a sampling pattern second-direction path range parameter which determines a second-direction path range for the instance of the first feature surface sampling pattern.

In various implementations, the sampling pattern first-direction path range parameter may be represented at the end of a first vector, and the sampling pattern second-direction path range parameter may be represented at the end of a second vector. A user is able adjust the sampling pattern first-direction and second-direction path range parameters by adjusting the sizes of the vectors and the corresponding first and second-direction path ranges for the instance of the first feature surface sampling pattern. In one implementation, the second vector may be an arc for which the length corresponds to a central angle of the arc and the first surface feature of the workpiece may correspond to at least one of a cylinder, sphere or cone. In an alternative implementation, the second vector may be a line and the first surface feature of the workpiece may correspond to a plane.

In various implementations, the sampling pattern first-direction path range parameter may determine the length of at least some of a plurality of sampling tracks and the sampling pattern second-direction path range parameter may determine a track spacing between at least some of the plurality of sampling tracks. In one implementation, the pattern parameters may further include a sampling pattern number of sampling locations per sampling track parameter which determines a number of sampling locations per sampling track for at least some of the plurality of sampling tracks. In one implementation, the sampling pattern number of sampling locations per sampling track parameter may be represented as a first sampling location out of a plurality of evenly spaced sampling locations that appear on a first sampling track. A user is able to graphically adjust the location of the first sampling location on the first sampling track so as to adjust the spacing and number of sampling locations that appear on at least some of the plurality of sampling tracks.

In various implementations, the plurality of sampling tracks may each include at least one sampling location. At least some of the plurality of sampling tracks may lie along a continuous path or may be discrete. In one implementation, at least some of the plurality of sampling tracks may each cover a 360 degree path, wherein each sampling track includes at least one sampling location.

DESCRIPTION OF THE DRAWINGS

FIG. 8A shows a state of a planar surface sampling pattern including linear tracks wherein a user graphically adjusts the density of pattern locations along its tracks;

FIG. 8B shows a state of a planar surface sampling pattern including linear tracks wherein a user graphically adjusts the density of its tracks;

FIG. 9A shows a state of the planar surface sampling pattern including circular tracks wherein a user graphically adjusts the angular range of all circular tracks simultaneously;

FIG. 9B shows a state of the planar surface sampling pattern including circular tracks wherein a user graphically adjusts the density of pattern locations along its tracks;

FIG. 9C shows a state of the planar surface sampling pattern including circular tracks wherein a user graphically adjusts the density of the tracks;

FIG. 10A shows a state of the cylindrical surface sampling pattern depicted in FIG. 6B, wherein a user adjusts the density of the tracks;

DETAILED DESCRIPTION

Figure 1:
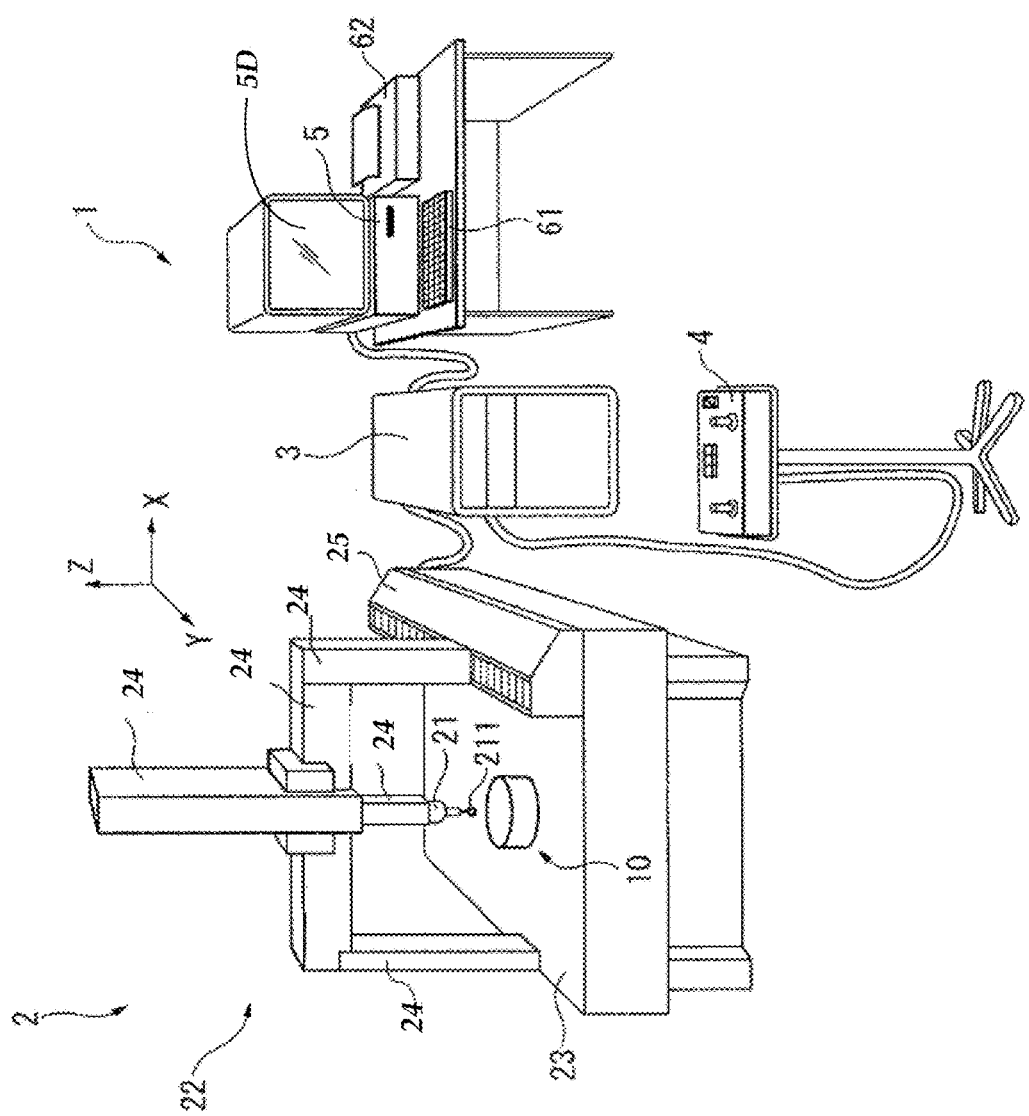
FIG. 1 is a diagram showing various typical components of a metrology system comprising a coordinate measuring machine.

FIG. 1 is a diagram showing various typical components of a metrology system 1 including a generic coordinate measuring machine, which provides one context for application of the principles disclosed herein. Certain aspects of the metrology system 1 are further described in the '746 patent. The metrology system 1 may include: a coordinate measuring machine body 2; a motion controller 3 that controls a drive of the coordinate measuring machine body 2; an operating unit 4 for manually operating the coordinate measuring machine body 2; a host computer 5 that issues commands to the motion controller 3 and executes processing such as shape analysis of a workpiece 10 (an object to be measured) disposed on the coordinate measuring machine body 2. A representative input unit 61 and output unit 62 are connected to the host computer 5, as well as a display unit 5D. The display unit 5D may display an editing environment user interface, for example as described further below with reference to FIG. 4.

The coordinate measuring machine body 2 includes: a probe 21 having a stylus 211 which may contact a surface of the workpiece 10; a movement mechanism 22 that includes a three axis slide mechanism 24 that holds the base end of the probe 21; and a drive mechanism 25 that drives the slide mechanism 24.

Figure 2:
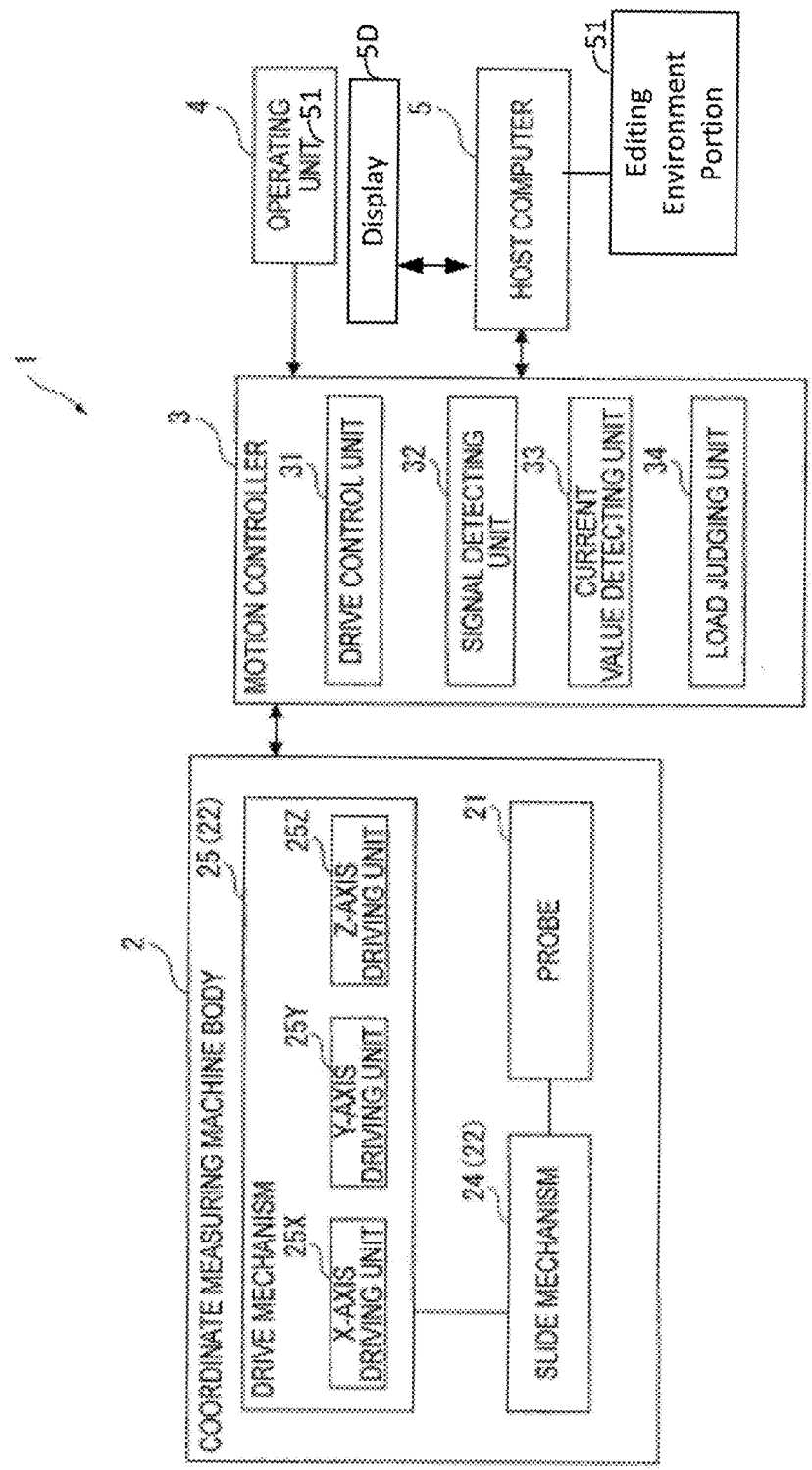
FIG. 2 is a block diagram showing the machine body, motion controller, operating unit, host computer, and an editing environment portion of the metrology system of FIG. 1.

FIG. 2 is a block diagram showing the machine body 2, motion controller 3, operating unit 4 and host computer 5 of the metrology system 1 of FIG. 1. As shown in FIGS. 1 and 2, the drive mechanism 25 includes axis driving units 25Y, 25X and 25Z that slides the components of the slide mechanism in three dimensions. Though not illustrated, the drive mechanism 25 is provided with a plurality of sensors outputting a signals in accordance with the displacement of the slide mechanism 24.

As shown in FIG. 2, the motion controller 3 (controller) is provided with: a drive control unit 31 that acts on command from the operating unit 4 or host computer 5; and a signal detecting unit 32 that detects the signal outputted by the sensors provided on the drive mechanism 25, to detect the three-dimensional displacement and output it to the host computer 5 to indicate the displacement or position of the stylus 211.

The host computer 5 includes a CPU (Central Processing Unit), a memory and the like. The host computer 5 outputs a predetermined command to the motion controller 3 to control the coordinate measuring machine body 2 to move the stylus 211 along a sampling path to measure the surface of the workpiece 10. As will be described in more detail below, in accordance with principles disclosed herein, the sampling path of the stylus 211 along a surface of the workpiece 10 may be controlled by workpiece feature inspection operations. As part of a method for programming the workpiece feature inspection operations, an editing environment (e.g. provided by editing environment portion 51 on the host computer 5) displays a 3-dimensional workpiece representation including at least a first surface feature of the workpiece 10. In various embodiments, surface sampling pattern for a feature is created based on a generic sampling pattern corresponding to the future type (e.g. a plane, cylinder, etc.) in which pattern parameters are adjusted to correspond to the inspection locations desired on that feature of the workpiece 10. A corresponding representation of the sampling pattern may include operative sampling pattern locations located proximate to the first surface feature on the display. User input operations in the GUI adjust the pattern parameters of the sampling pattern. Certain pattern parameter adjustment features disclosed herein simultaneously affects a plurality of the sampling pattern locations, as will be described in more detail below with respect to FIGS. 4A-9, resulting in significantly improved editing throughput and ease-of-use in comparison to previously known methods.

In various implementations, the metrology system 1 includes suitable unitary or distributed computing systems or devices, which may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as disk drives, solid-state memories, or any other medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and accessed via service calls.

Figure 3:
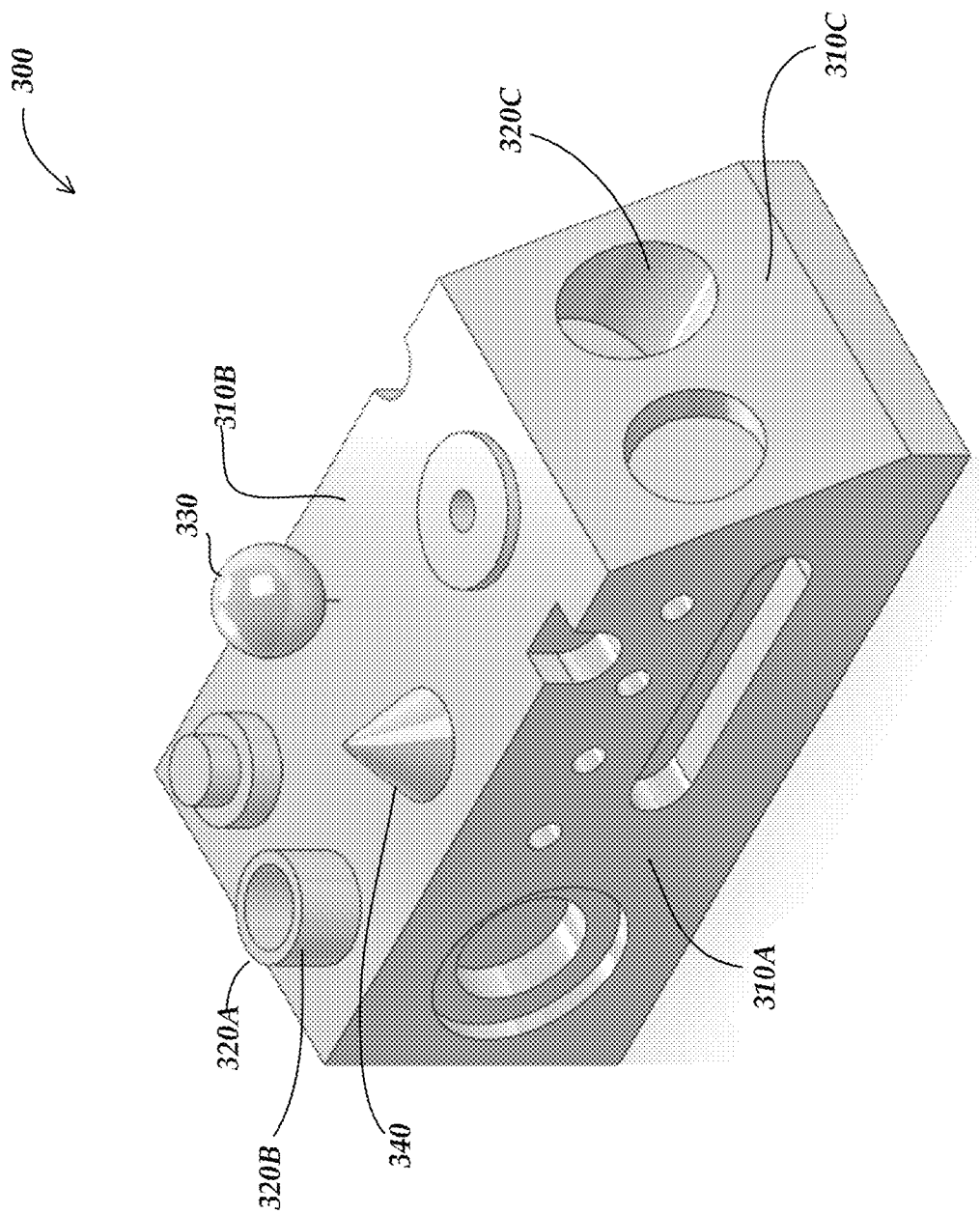
FIG. 3 is a diagram of a workpiece illustrating various types of surface features.

FIG. 3 is a diagram of a workpiece 300 illustrating various types of surface features. As shown in FIG. 3, the workpiece 300 includes representative planar surface features 310x, cylindrical surface features 320x, a spherical surface feature 330 and a conical surface feature 340. Not all surface features are labeled, just some representative examples. As described herein, a measurement sampling path for a coordinate measuring machine (e.g. for a touch probe, or other surface location sensor), comprising a plurality of surface sampling locations, may be generated using a generic sampling pattern which corresponds to the type of surface feature that is being measured, and automatically conforming that sampling pattern to the surface feature. According to principles disclosed herein, such type-specific sampling patterns may be displayed including user interface features which make it particularly intuitive and easy to adjust the surface sampling locations to the idiosyncrasies of particular individual workpiece features, as will be described in more detail below.

Figure 4:
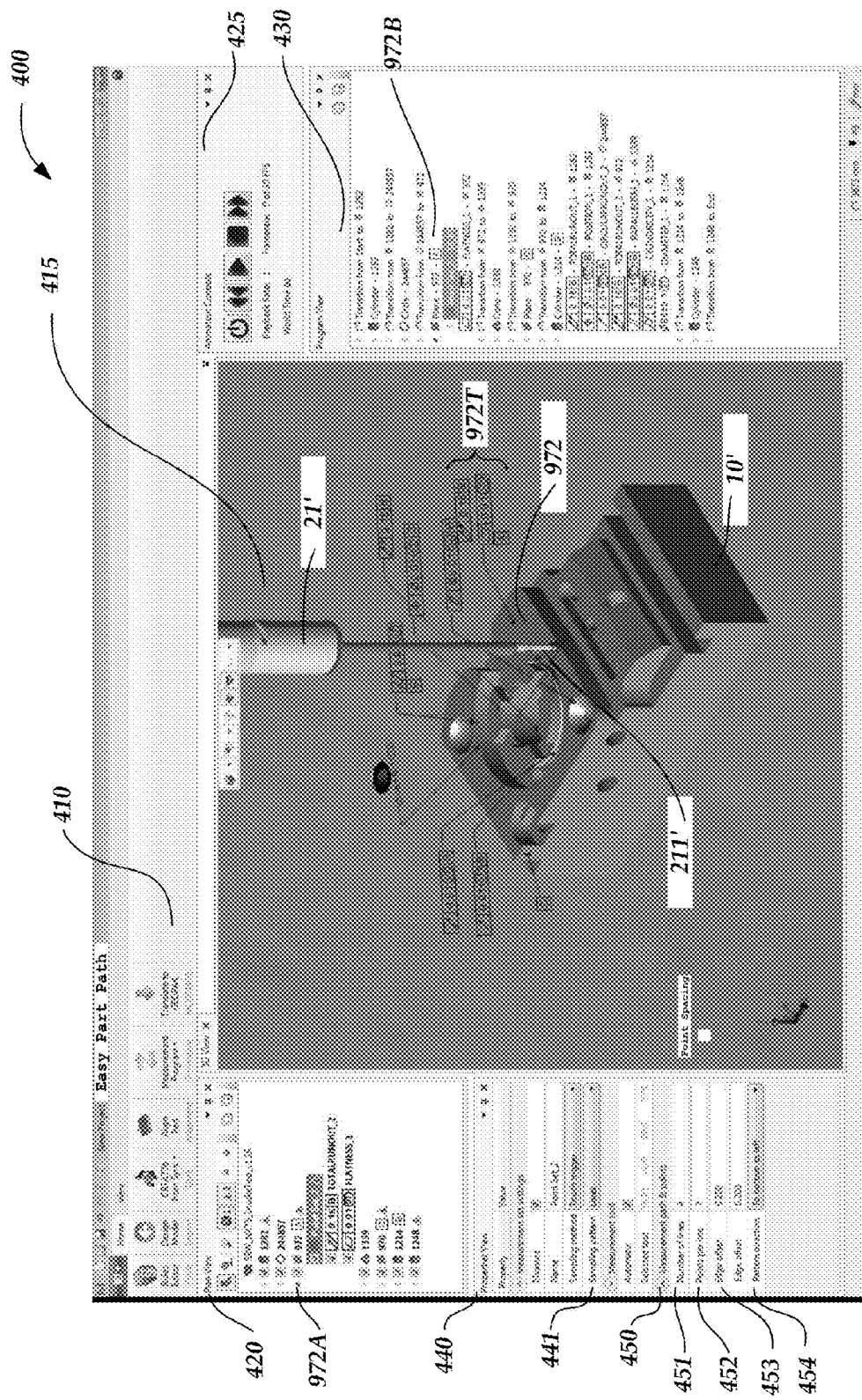
FIG. 4 is a diagram of one state of a user interface comprising one embodiment of an programming or editing environment, including one embodiment of user interface features related to type-specific sampling patterns according to principles disclosed herein.

FIG. 4 is a diagram 400 of one state of a user interface comprising one embodiment of an programming environment 405 (also referred to as an editing environment) of a metrology system (e.g. as may be shown on the display 5D of the metrology system 1, of FIG. 1), including one embodiment of certain user interface features related to type-specific sampling patterns according to principles disclosed herein. In the embodiment shown in FIG. 4, the programming environment 405 includes a menu bar 410, a simulation view window 415, a measurement plan window 420, and animation control display 425, a program window 430, and a feature inspection parameter (or properties) window 440.

The simulation view window 415 shows a touch probe 21' having a stylus 211', and a workpiece 10'. In the state illustrated, the touch probe stylus is contacting a plane feature designated "972", having displayed tolerances 972T, and the other user interface windows are coordinated with the simulation view window 415 to show information corresponding to the plane feature 972. For example, at reference number 972A the measurement plan window 420 indicates that the plane feature 972 is selected (e.g. as indicated by the selection box surrounding its "point set 2" child node). It may be seen that the measurement plan window marks the "feature type" of plane feature 972 using a plane icon, and other feature types using a cone icon, or cylinder icon, etc., as appropriate. Similarly, at reference number 972B the program window 430 indicates that the plane feature 972 is selected (e.g. as indicated by the selection box surrounding its "point set 2" child node), and marks the "feature type" of plane feature 972 using a plane icon, and other feature types using a cone icon, or cylinder icon, etc., as appropriate.

The feature inspection parameter (or properties) window 440 shows default and/or current parameters related to collecting measurements that characterize the currently selected plane feature 972. In the embodiment shown in FIG. 4, these include a "measure" checkbox which allows measurement of the future to be turned on and off (skipped), a measurement data set "name" box, a "sampling method" selection box which includes a drop-down menu including the various probe types available on the metrology system for collecting the measurement data set, and a "sampling pattern" selection box 441 which includes a drop-down menu including the pattern track types available for planar sampling pattern. In various embodiments, a planar sampling pattern may be automatically chosen for the currently selected plane feature 972. Pattern track types for a planar sampling pattern may include, for example, lines (straight lines), circles and spirals, as described in greater detail below with reference to FIGS. 5A-5C. The window 440 further includes a "measurement tool" definition portion for defining how a particular probe within the selected probe type is to be chosen for the current feature.

The window 440 further includes a "measurement path and points" definition portion 450 for defining default or current parameters that govern the selected pattern track type (e.g. the planar pattern track type "lines", in the particular example shown in FIG. 4.) In the embodiment shown in FIG. 4, these include a track density box 451 for defining the density of the sampling tracks to be distributed in the sampling pattern, and a "points on line" box 452 for defining the density of the measurement sample locations to be distributed along each of the tracks. In the particular example shown in FIG. 4, the track density is defined by entering the number of tracks or lines to be included in the sampling pattern. However, it will be appreciated that the density of the measurement tracks may alternatively be defined in terms of an absolute spacing between the tracks (e.g. 5 mm), or automatically based on the feature size, or some other method if desired. Similarly, in the particular example shown in FIG. 4, the measurement sample location density along a track is defined by entering the number of sampling locations to be distributed along each track. However, it will be appreciated that the density of the measurement sample locations along the track may alternatively be defined in terms of an absolute spacing between sample locations (e.g. 5 mm), or automatically based on the feature size, or some other method if desired. Graphical user interface features which make it particularly intuitive and easy to adjust the parameters that govern the track density and the sampling locations along each track in relation to the idiosyncrasies of individual workpiece features are described in greater detail below with reference to FIGS. 5-12.

The "measurement path and points" definition portion 450 may further include an "edge offset" definition box 453, for defining a minimum allowable distance (e.g. in current units, such as millimeters) between certain defining edges (or edge portions) of the current feature and a nearby measurement track and/or sample location. In various embodiments, this parameter may be used as an aid in establishing an initial and/or default size and/or location of a generic sampling pattern type when it is automatically initially fit to a corresponding type of workpiece feature. The "measurement path and points" definition portion 450 may further include an "pattern direction" definition box 454, for defining a track orientation and/or how a measurement probe proceeds along the set of measurement tracks of a sampling pattern (e.g. proceeding towards the bottom along a first measurement track and towards the left to reach the beginning of the second measurement track, and so on, for the example illustrated in FIG. 4. Exemplary embodiments of sampling pattern tracks, and how a probe may proceed along them, are described in greater detail below with reference to FIGS. 5-7.

Figure 5A:
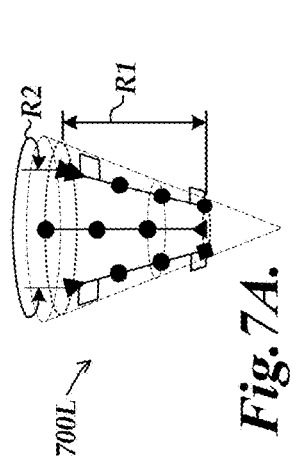
FIGS. 5A, 5B and 5C are diagrams of planar type surface sampling patterns, useful for defining a measurement path along sampling pattern locations proximate to a planar surface feature of a workpiece.
Figure 5B:
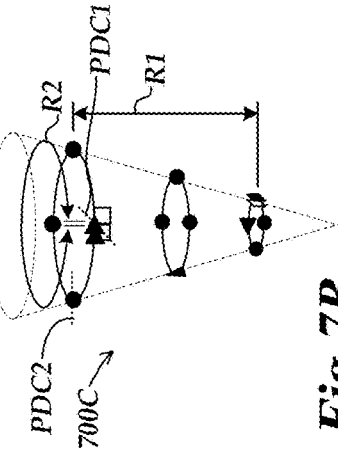
Figure 5C:
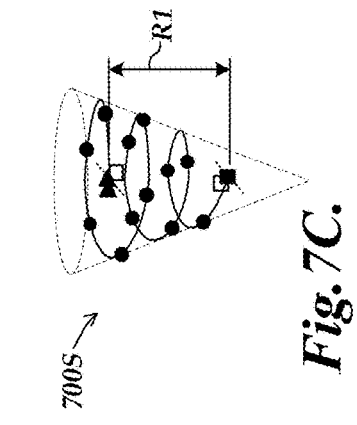
Figure 6A:
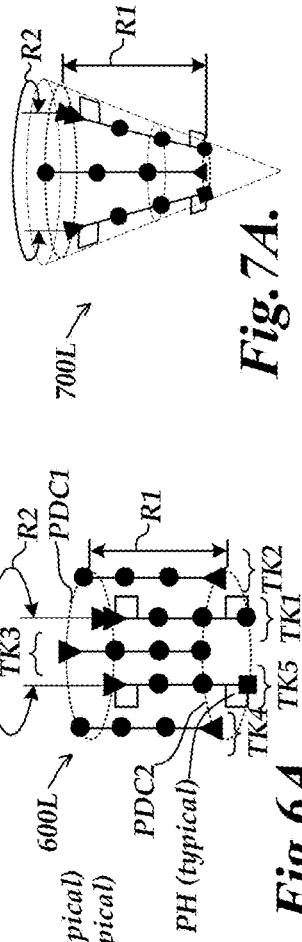
FIGS. 6A, 6B and 6C are diagrams of cylindrical type surface sampling patterns, useful for defining a measurement path along sampling pattern locations proximate to a cylindrical surface feature of a workpiece.
Figure 6B:
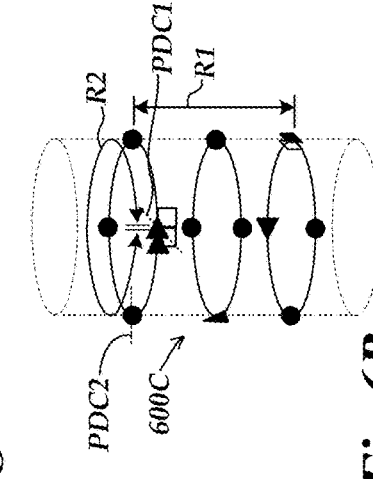
Figure 6C:
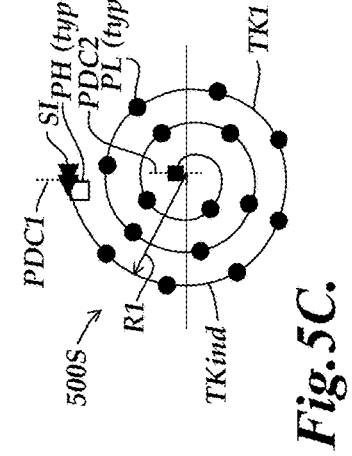
Figure 7A:
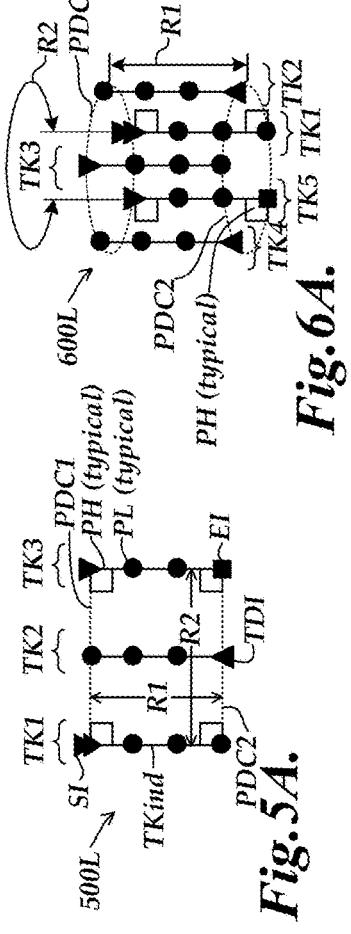
FIGS. 7A, 7B and 7C are diagrams of conical type surface sampling patterns, useful for defining a measurement path along sampling pattern locations proximate to a conical surface feature of a workpiece.
Figure 7B:
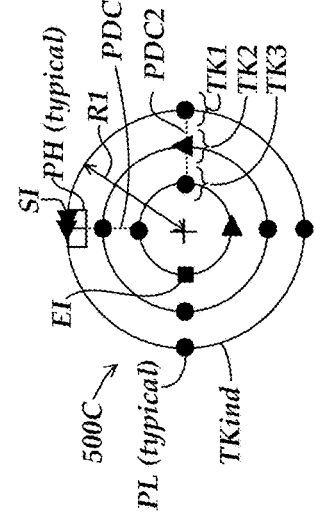
Figure 7C:
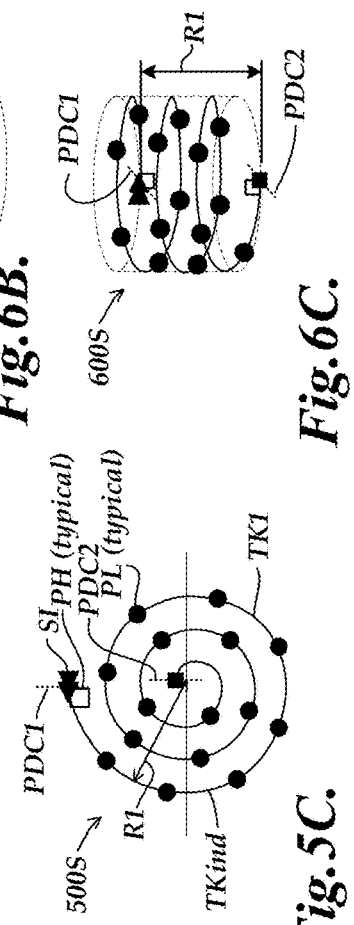

FIGS. 5A, 5B and 5C are diagrams of planar type surface sampling patterns 500L, 500C, and 500S, respectively, useful for defining a measurement path along sampling pattern locations proximate to a planar surface feature of a workpiece. In some figures, phantom feature shapes are shown in dotted or dashed outline, for reference. FIGS. 6A, 6B and 6C are diagrams of cylindrical type surface sampling patterns 600L, 600C, and 600S, respectively, useful for defining a measurement path along sampling pattern locations proximate to a cylindrical surface feature of a workpiece. FIGS. 7A, 7B and 7C are diagrams of conical type surface sampling patterns 700L, 700C, and 700S, respectively, useful for defining a measurement path along sampling pattern locations proximate to a conical surface feature of a workpiece.

The illustrated surface sampling patterns 500L, 600L, 700L (L for linear); 500C, 600C, 700C (C for circular); and 500S, 600S, 700S (S for spiral), may each be considered as graphical inspection point programming GIPP) elements or sampling pattern representations illustrating one exemplary set of user interface features which may be used to represent and/or modify, edit or adjust the corresponding surface sampling pattern in relation to a workpiece feature (e.g. when superimposed on the workpiece feature in the simulation view window 415, shown in FIG. 4), with the results to be embodied in a corresponding workpiece inspection program. It will be appreciated that the planar, cylindrical, and conical sampling patterns disclosed herein are exemplary only, and not limiting. For example, it will be understood that a spherical type surface sampling pattern, representation, and GIPP, or other generic types (shapes) may be provided using the principles disclosed herein.

As shown in FIG. 5A, the planar surface sampling pattern representation 500L (sampling pattern 500L, for short) includes linear sampling tracks TK1-TK3, represented by solid line track indicators TKind. In one implementation, sampling tracks may generally be defined as a path or line comprising one or more sampling pattern locations. Each of the sampling tracks TK1-TK3 is shown to include four evenly spaced sampling pattern locations PL, represented by circles, triangles or arrows, and a square. Default or current parameters that govern an initial number of sampling tracks TK and sampling pattern locations PL along the tracks may be defined using the "measurement path and points" definition portion 450, previously outlined with reference to FIG. 4, or an analogous definition portion, for example. Adjustment of the parameters in the user interface may follow. As shown in FIG. 5A, in one embodiment triangles may be track direction indicators TDI, indicating the first measurement location along the track, and pointing the direction that a probe proceeds along that track. Furthermore, a double triangle may be sampling pattern starting indicator SI, indicating the first measurement location in a sampling pattern, and a square may be a sample pattern ending indicator EI, indicating the last measurement location in a sampling pattern. A probe motion path through a sampling pattern may be understood based on the indicators outlined above. Two pattern density controls PDC1 and PDC2 (indicated by dotted or dashed lines) may be located at the ends of the tracks. At the corners of the sampling pattern 500L, four pattern handles PH are represented by squares. In the illustrated embodiment, the pattern handles PH may border, follow, and/or adjust the outermost track indicators and correspond to, and/or define, the size of the sampling pattern 500L. In various embodiments, a user may use a mouse cursor in the user interface to drag the pattern handles PH according to known methods, in order to resize the sampling pattern 500L. Size of the sampling pattern 500L may be characterized in a part program by size or range parameters R1 and R2, along respective directions. In some embodiments, the range parameters need not be listed in the feature inspection parameter window 440, or the like, because they may be initially determined automatically based on a feature size (in combination with a defined edge offset, for example), and thereafter may be sufficiently represented and adjusted graphically using the pattern handles PH.

For the sampling pattern 500L, various sampling pattern parameters (e.g. relating to the size or location of the sampling pattern representation, the number or spacing of sampling tracks, the number or spacing of sampling pattern locations, etc.) may be adjusted in accordance with input from a user. In various implementations, the user input operations for adjusting the pattern parameters may be provided by at least one a) control of dedicated GUI elements (e.g. such as the elements or controls outlined immediately above), touch gestures, entries in dialog boxes (e.g. in the window 440, for example), etc. In one specific example implementation, using a touchscreen for the display 5D, known types of touch gestures within the boundaries of the sampling pattern 500L may be utilized to expand or contract the size of the sampling pattern, the sampling track spacing, the sampling location spacing, etc.

In addition to graphically controlling the location and/or size of a sampling pattern by dragging the pattern handles PH as outlined above, specific example implementations for controlling the dedicated GUI elements of the sampling pattern 500L may include the following: By using a mouse to "click and hold" anywhere within the boundaries of the sampling pattern that does not include a specific element, sampling pattern 500L may be dragged to a new location. "Click and hold" on other specific elements can be used to drag them. Operations related to dragging a track indicator TKind or pattern density control PDC are described in greater detail below with respect to FIGS. 8A, 8B, 9A-9C, and 10. In some embodiments, specific elements may be selected (e.g. by selecting with the cursor and double-clicking, or hovering, or other known GUI selection method), and after selection they may be dragged or deleted, or the like, according to known methods.

FIG. 6A shows the cylindrical surface sampling pattern representation 600L (sampling pattern 600L, for short), which includes linear tracks and other elements which appear and operate similarly to corresponding elements previously described with reference to the sampling pattern 500L. The appearance and operation of sampling pattern 600L may be generally understood by analogy with the description of sampling pattern 500L. Therefore, only significant differences will be described in detail here. Briefly, the cylindrical surface sampling pattern 600L includes linear sampling tracks TK1-TK5, each including four evenly spaced sampling pattern locations PL. Track direction indicators TDI, starting indicator SI, and ending indicator EI, are depicted. Two pattern density controls PDC1 and PDC2 (indicated by dotted or dashed lines) may be located at the ends of the tracks. At the corners of the sampling pattern 600L, four pattern handles PH (represented by squares) may border, follow, and/or adjust the adjacent track indicators (with the even distribution of remaining tracks and pattern locations being automatically adjusted) to correspond to, and/or define, the size the sampling pattern 600L. Size of the sampling pattern 600L may be characterized in a part program by size or range parameters R1 and R2. In this case the range parameter R1 may extend along the cylinder axis direction, and the range parameter R2 may define an arc length or angle about the cylinder axis. In some embodiments, the range parameter R2 may be initially determined automatically based on an even distribution of tracks about the feature, to be adjusted graphically later if desired, using the pattern handles PH. A radial dimension parameter is not needed in the user interface because the pattern is configured to automatically conform to the underlying workpiece feature.

For the sampling pattern 600L, various sampling pattern parameters (e.g. relating to the size or location of the sampling pattern representation, the number or spacing of sampling tracks, the number or spacing of sampling pattern locations, etc.) may be adjusted in accordance with input from a user, by analogy with operations outlined previously, and/or as described below with reference to FIGS. 8A, 8B, 9A-9C and 10, for example.

FIG. 7A shows the conical surface sampling pattern representation 700L, which includes linear tracks and other elements which appear and operate similarly to corresponding elements previously described with reference to the cylindrical surface sampling pattern 600L. The appearance and operation of sampling pattern 700L may be generally understood by analogy with the description of sampling pattern 600L, and need not be further described here.

FIG. 5B shows the planar surface sampling pattern representation 500C (sampling pattern 500C, for short), which includes circular tracks and other elements which otherwise appear and operate similarly to corresponding elements previously described with reference to the sampling pattern 500L. Circular tracks, as opposed to linear tracks, may be chosen in the "sampling pattern" selection box 441 of the feature inspection parameter window 440, as previously outlined with reference to FIG. 4, for example. The appearance and operation of sampling pattern 500C may be generally understood by analogy with the description of sampling pattern 500L. Therefore, only significant differences will be described in detail here. Briefly, the planar surface sampling pattern 500C includes circular sampling tracks TK1-TK3, each including four evenly spaced sampling pattern locations PL (evenly spaced in terms of angular separation along the circular tracks, that is.) Default or current parameters that govern an initial number of sampling tracks TK and sampling pattern locations PL along the tracks may be defined using the "measurement path and points" definition portion 450, previously outlined with reference to FIG. 4, or an analogous definition portion, for example. Track direction indicators TDI, starting indicator SI, and ending indicator EI, are depicted, as previously outlined. Two pattern density controls PDC1 and PDC2 (indicated by dotted or dashed lines) may be located at the pattern locations closest to the ends of the tracks. Two pattern handles PH (represented by squares) may border, follow, and/or adjust the outer circular track indicator, to correspond to, and/or define, the size and/or shape of the sampling pattern 500C. The size of the sampling pattern 500C may be characterized in a part program by size or range parameters R1 and R2. In this case the range parameter R1 may extend along the radial direction, and the range parameter R2 may define an arc length or angle about the center of the circular tracks (R2 is shown in FIG. 9A). In some embodiments, the range parameter R2 may be initially determined automatically to cover 360°, such that the pattern handles PH are adjacent or overlapping as illustrated in FIG. 5B, to be adjusted graphically later if desired, using the pattern handles PH. The operation of the pattern handles PH and the range parameter R2 are shown and described in greater detail with reference to FIG. 9A, below, for example.) For the sampling pattern 500C, various sampling pattern parameters (e.g. relating to the size or location of the sampling pattern representation, the number or spacing of sampling tracks, the number or spacing of sampling pattern locations, etc.) may be adjusted in accordance with input from a user, by analogy with operations outlined previously, and/or as described below with reference to FIGS. 8A, 8B, 9A-9C and 10, for example.

FIG. 6B shows the cylindrical surface sampling pattern representation 600C (sampling pattern 600C, for short), which includes circular tracks and other elements which appear and operate similarly to corresponding elements previously described with reference to the sampling pattern 500C. The appearance and operation of sampling pattern 600C may be generally understood by analogy with the description of sampling pattern 500C, and others. Therefore, only significant differences will be described in detail here. Briefly, the cylindrical surface sampling pattern 600C includes circular sampling tracks TK1-TK3, each including four evenly spaced sampling pattern locations PL. Track direction indicators TDI, starting indicator SI, and ending indicator EI, are depicted, as previously outlined. Two pattern density controls PDC1 and PDC2 (indicated by dotted or dashed lines) may be located at the pattern locations closest to the ends of the top track. Two pattern handles PH (represented by squares) may border, follow, and/or adjust the radius, axial location, and angular range of the top track (with the angular range and even axial distribution of remaining tracks and pattern locations being automatically adjusted), and one pattern handle PH may border, follow, and/or adjust the radius and axial location of the bottom track, all to correspond to, and/or define, the size and/or shape of the sampling pattern 600C. The size of the sampling pattern 600C may be characterized in a part program by size or range parameters R1 and R2. In this case the range parameter R1 may extend along the direction of the cylinder axis, and the range parameter R2 may define an arc length or angle about the cylinder axis. In some embodiments, the range parameter R2 may be initially determined automatically to cover 360°, such that the pattern handles PH are adjacent or overlapping as illustrated in FIG. 6B, to be adjusted graphically later if desired, using the pattern handles PH. The operation of the pattern handles PH and the range parameter R2 may be understood by analogy with reference to FIG. 9A, below.) A radial dimension parameter is not needed in the user interface because the pattern is configured to automatically conform to the underlying workpiece feature. For the sampling pattern 600C, various sampling pattern parameters (e.g. relating to the size or location of the sampling pattern representation, the number or spacing of sampling tracks, the number or spacing of sampling pattern locations, etc.) may be adjusted in accordance with input from a user, by analogy with operations outlined previously, and/or as described below with reference to FIGS. 9A-9C and 10, for example.

FIG. 7B shows the conical surface sampling pattern representation 700C, which includes circular tracks and other elements which appear and operate similarly to corresponding elements previously described with reference to the cylindrical surface sampling pattern 600C. The appearance and operation of sampling pattern 700C may be generally understood by analogy with the description of sampling pattern 600C, and need not be further described here.

FIG. 5C shows the planar surface sampling pattern representation 500S (sampling pattern 500S, for short), which includes a spiral track and other elements which otherwise appear and operate similarly to corresponding elements previously described with reference to the sampling patterns 500L and 500C, and others, and the appearance and operation of sampling pattern 500S may be generally understood by analogy. Therefore, only significant differences will be described in detail here. A spiral track, as opposed to linear or circular tracks, may be chosen in the "sampling pattern" selection box 441 of the feature inspection parameter window 440, as previously outlined with reference to FIG. 4, for example. Briefly, in the particular example shown in FIG. 5C, the surface sampling pattern 500S includes a planar spiral track TK1 including three evenly spaced 360° turns. The spiral track TK1 includes evenly spaced sampling pattern locations PL. Default or current parameters that govern an initial number of turns and number of sampling pattern locations PL along the spiral track may be defined using the "measurement path and points" definition portion 450, previously outlined with reference to FIG. 4, or an analogous definition portion, for example. Track starting indicator SI, and ending indicator EI, are depicted, as previously outlined. Two pattern density controls PDC1 and PDC2 (indicated by dotted or dashed lines) may be located at the pattern locations closest to the ends of the spiral track. A pattern handle PH (represented by squares) may border, follow, and/or adjust the outer starting point of the spiral track, to correspond to, and/or define, the radial size of the sampling pattern 500S. The size of the sampling pattern 500S may be characterized in a part program by the radial size or range parameter R1. For the sampling pattern 500S, various sampling pattern parameters (e.g. relating to the size or location of the sampling pattern representation, the number turns, the number or spacing of sampling pattern locations, etc.) may be adjusted in accordance with input from a user, by analogy with operations outlined previously, and/or as described below with reference to FIGS. 8A, 8B and 9A-9C. For example, in addition to dragging the pattern location, or the pattern handle (to change the size), the user may drag any part of the track indicator radially, to adjust the density of the turns along the radial direction (with the even distribution of pattern locations along the track being automatically adjusted). The user may furthermore drag either of the pattern density controls PDC1 and PDC2 along the track to adjust the density of pattern locations along the track.

FIG. 6C shows the cylindrical surface sampling pattern representation 600S (sampling pattern 600S, for short), which includes a spiral track and other elements which appear and operate similarly to corresponding elements previously described with reference to the sampling pattern 500S. The appearance and operation of sampling pattern 600S may be generally understood by analogy with the description of sampling pattern 500S, and others. Therefore, only significant differences will be described in detail here. Briefly, in the particular example shown in FIG. 6C, the surface sampling pattern 600S includes a helical spiral track TK1 including three evenly spaced 360° turns, automatically conforming to the underlying cylinder, distributed along the direction of the cylinder axis. The spiral track TK1 includes evenly spaced sampling pattern locations PL. Track direction indicators TDI, starting indicator SI, and ending indicator EI, are depicted, as previously outlined. Two pattern density controls PDC1 and PDC2 (indicated by dotted or dashed lines) may be located at the pattern locations closest to the ends of the spiral track. Two pattern handles PH (represented by squares) may border, follow, and/or adjust the starting and ending points of the spiral track, to correspond to, and/or define, the axial size of the sampling pattern 600S. The size of the sampling pattern 600S may be characterized in a part program by the axial size or range parameter R1. A radial dimension parameter is not needed in the user interface because the pattern is configured to automatically conform to the underlying workpiece feature. For the sampling pattern 600S, various sampling pattern parameters (e.g. relating to the size or location of the sampling pattern representation, the number turns, the number or spacing of sampling pattern locations, etc.) may be adjusted in accordance with input from a user, by analogy with operations outlined previously, and/or as described below with reference to FIGS. 8A, 8B and 9A-9C. For example, in addition to dragging the pattern location, or the pattern handle (to change the size), the user may drag any part of the track indicator axially, to adjust the density of the turns along the axial direction (with the even distribution of pattern locations along the track being automatically adjusted). The user may furthermore drag either of the pattern density controls PDC1 and PDC2 along the track to adjust the density of pattern locations along the track.

FIG. 7C shows the conical surface sampling pattern representation 700S, which includes a spiral track and other elements which appear and operate similarly to corresponding elements previously described with reference to the cylindrical surface sampling pattern 600S. The appearance and operation of sampling pattern 700S may be generally understood by analogy with the description of sampling pattern 600S, and need not be further described here.

FIG. 8A shows a state of the planar surface sampling pattern representation 500L, wherein the previously outlined pattern density control PDC2 is being controlled by a user dragging it using a mouse cursor CSR, on order to adjust the density of the pattern locations along all the tracks simultaneously. In the example shown, the user has previously selected the pattern density control PDC2 at its original location 801, and dragged it to the location 802. In the illustrated embodiment, the pattern density control PDC2 drags the associated pattern location representations along the tracks with it. An even spacing distance SD is automatically maintained between the pattern locations along the tracks, such that the spacing distance SD becomes less, and the pattern location density along the track becomes greater. It will be understood that dragging the pattern density control PDC2 in the opposite direction would have the opposite effect on the spacing distance SD. In the particular embodiment illustrated, phantom set of pattern locations 803 is automatically created and displayed in the user interface (e.g. as soon as the user starts dragging the pattern density control PDC2), according to the dynamic spacing distance SD and as affected by the dragging operation. If the set of phantom pattern locations 803 is dragged inside the original range of the sampling pattern 500 L (as defined by the original position of the pattern handles PH), in some embodiments an additional phantom set of pattern locations is automatically generated. When the user terminates the dragging operation, any pattern locations within the original range of the sampling pattern 500L will be retained at their final location in the sampling pattern 500 L. Any phantom pattern locations outside the original range of the sampling pattern 500 L will be discarded, or in some embodiments classified as "inoperative locations" (e.g. as outlined below with reference to FIG. 11.)

It will be understood that the effect of any adjustments made graphically according to principles disclosed herein, will be reflected in the resulting part program. In addition, any user interface window which displays parameters which correspond to the graphical adjustments may be automatically updated to display new parameter values corresponding to the adjustments.

FIG. 8B shows a state of the planar surface sampling pattern representation 500L, wherein a track indicator is being controlled by a user dragging it using a mouse cursor CSR, on order to adjust the density of the tracks. In the example shown, the user has previously selected the track indicator TKind at its original location 811, and dragged it to the location 812. In the illustrated embodiment, the track indicator drags the associated pattern location representations along with it. An even track spacing distance TSD is automatically maintained between the tracks, such that the track spacing distance TSD becomes less, and the track density in the sampling pattern 500L becomes greater. It will be understood that dragging the track indicator TKind in the opposite direction would have the opposite effect on the track spacing distance TSD. In the particular embodiment illustrated, a phantom track 813, including pattern locations, is automatically created and displayed in the user interface (e.g. as soon as the user starts dragging the track indicator), according to the dynamic spacing distance TSD and as affected by the dragging operation. If the phantom track 813 is dragged inside the original range of the sampling pattern 500L (as defined by the original position of the pattern handles PH), in some embodiments an additional phantom track is automatically generated. When the user terminates the dragging operation, any tracks and pattern locations within the original range of the sampling pattern 500L will be retained at their final location in the sampling pattern 500L. Any phantom track outside the original range of the sampling pattern 500L will be discarded, or in some embodiments it's pattern locations may be classified as "inoperative locations" (e.g. as outlined below with reference to FIG. 11.)

FIG. 9A shows a state of the planar surface sampling pattern representation 500C, depicted in FIG. 5B, wherein a previously outlined pattern handle PH is being controlled by a user dragging it using a mouse cursor CSR, on order to adjust the range R2, which affects the lengths of all the tracks simultaneously. In the example shown, the user has previously selected the pattern handle PH at its original location 901, and dragged it to the location 902. In the illustrated embodiment, the pattern handle PH drags the pattern density control PDC2 and the associated pattern location representations along the tracks with it. That is, an even spacing distance SD is automatically maintained between the pattern locations along the tracks, such that the spacing distance SD becomes less, and the pattern location density along the track becomes greater.

FIG. 9B shows a state of the planar surface sampling pattern representation 500C depicted in FIG. 9A, wherein the previously outlined pattern density control PDC2 is being controlled by a user dragging it using a mouse cursor CSR, on order to adjust the density of the pattern locations along all the tracks simultaneously. In the example shown, the user has previously selected the pattern density control PDC2 at the location 911, and dragged it to the location 912. In the illustrated embodiment, the pattern density control PDC2 drags the associated pattern location representations along the tracks with it. An even spacing distance SD is automatically maintained between the pattern locations along the tracks, such that the spacing distance SD becomes less, and the pattern location density along the track becomes greater. In the particular embodiment illustrated, a set of pattern locations 913 is automatically created and displayed in the user interface (e.g. as soon as the user starts dragging the pattern density control PDC2), according to the dynamic spacing distance SD and as affected by the dragging operation. The set of phantom pattern locations 913 is dragged along inside the range of the sampling pattern 500C (as defined by the position of the pattern handles PH). When the user terminates the dragging operation, any pattern locations within the range of the sampling pattern 500C will be retained at their final location in the sampling pattern 500C.

FIG. 9C shows a state of the planar surface sampling pattern representation 500C, depicted in FIG. 5B, wherein a track indicator is being controlled by a user dragging it using a mouse cursor CSR, on order to adjust the density of the tracks. In the example shown, the user has previously selected the track indicator TKind at its original location 921, and dragged it to the location 922. In the illustrated embodiment, the track indicator drags the associated pattern location representations along with it. An even track spacing distance TSD is automatically maintained between the tracks, such that the track spacing distance TSD becomes less, and the track density in the sampling pattern 500C becomes greater. In the particular embodiment illustrated, a phantom track 923, including pattern locations, is automatically created and displayed in the user interface (e.g. as soon as the user starts dragging the track indicator), according to the dynamic spacing distance TSD and as affected by the dragging operation. If the phantom track 923 is dragged inside the original range of the sampling pattern 500C (as defined by the original position of the pattern handles PH), in some embodiments an additional phantom track is automatically generated. When the user terminates the dragging operation, any tracks and pattern locations within the original range of the sampling pattern 500C will be retained at their final location in the sampling pattern 500C. Any phantom track outside the original range of the sampling pattern 500C will be discarded, or in some embodiments it's pattern locations may be classified as "inoperative locations" (e.g. as outlined below with reference to FIG. 11.)

FIG. 10A shows a state of the cylindrical surface sampling pattern representation 600C, depicted in FIG. 6B, wherein a track indicator is being controlled by a user dragging it along the axial direction of the cylinder using a mouse cursor CSR, on order to adjust the density of the tracks. In the example shown, the user has previously selected the track indicator TKind at its original location 1011, and dragged it to the location 1012. In the illustrated embodiment, the track indicator drags the associated pattern location representations along with it. An even track spacing distance TSD is automatically maintained between the tracks, such that the track spacing 600C becomes greater. In the particular embodiment illustrated, a phantom track 1013, including pattern locations, is automatically created and displayed in the user interface (e.g. as soon as the user starts dragging the track indicator), according to the dynamic spacing distance TSD and as affected by the dragging operation. If the phantom track 1013 is dragged inside the original range of the sampling pattern 600C (as defined by the original position of the pattern handles PH), in some embodiments an additional phantom track is automatically generated. When the user terminates the dragging operation, any tracks and pattern locations within the original range of the sampling pattern 600C will be retained at their final location in the sampling pattern 600C. Any phantom track outside the original range of the sampling pattern 600C will be discarded, or in some embodiments it's pattern locations may be classified as "inoperative locations" (e.g. as outlined below with reference to FIG. 11.)

Figure 11:
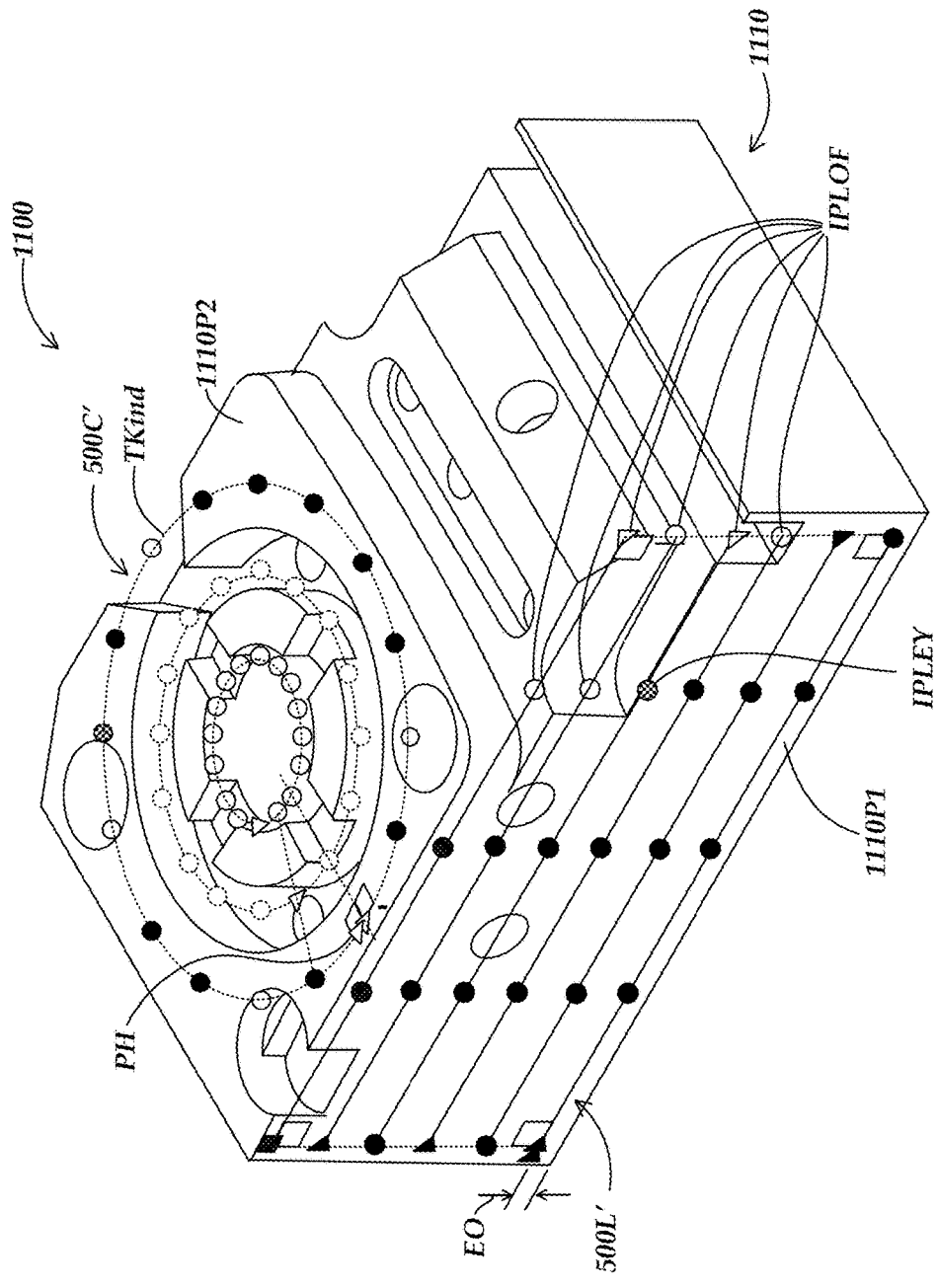
FIG. 11 shows one embodiment of a portion of user interface of a programming environment in a first state, wherein a first and second automatically configured planar sampling patterns are shown superimposed on a representation of a workpiece.

FIG. 11 is an illustration showing one embodiment of a portion of user interface of a programming environment (e.g. as depicted in the previously outlined simulation view window 415, shown in FIG. 4) in a first state 1100, wherein a first planar sampling pattern 500L' (analogous to the previously described sampling pattern 500L, which has linear tracks) and a second player sampling pattern 500C' (analogous to the previously described sampling pattern 500C, which has circular tracks) are shown superimposed on a representation of a workpiece 1110. In the illustrated example, the user interface 1100 is in a state wherein the sampling pattern 500L' has been automatically configured and fit to the plane feature 1110 P1 (that is, the vertical side of the workpiece) based on a corresponding default set of sampling pattern parameters (e.g. analogous to those previously outlined with reference to the feature inspection parameter window 440). Similarly, the sampling pattern 500C' has been automatically configured and fit to the plane feature 1110P2 (that is, the horizontal top surface of the workpiece) based on a corresponding default set of sampling pattern parameters.

Regarding the sampling pattern 500L', because it has been automatically sized and located relative to certain governing edges of the plane feature 1110P1, according to default offset distance EO for example, and according to various default parameters, some pattern locations within the sampling pattern 500L' may be classified as inoperative, and their display in the user interface may be coded to indicate their classification. For example, in the illustrated embodiment of user interface 1100, the locations IPLEV are filled with a crosshatch pattern, to indicate that they are classified as inoperative pattern locations that violate an edge offset criteria (e.g. as established by the previously outlined edge offset parameter). Similarly, the locations IPLOF are empty or filled with white, to indicate that they are classified as inoperative pattern locations because they are located off the feature. Operative locations are filled with a solid colored, to indicate that there are classified as operative pattern locations. It will be understood that, in some embodiments, once a user performs operations that accept a final configuration for a sampling pattern, that inoperative locations may be eliminated from the display and various element representations may change to more accurately reflect the probe path through the sampling pattern, etc. In any case, in various embodiments, only operative pattern locations are used as inspection locations visited by the probe in a resulting part program.

Regarding the sampling pattern 500C', operative and inoperative pattern locations are coded with fill patterns corresponding to those outlined above. It should be noted that for purposes of clarity in a black-and-white illustration, certain elements of the sampling pattern 500C' are shown in dashed outline, for the sole purpose of avoiding visual confusion with adjacent features of the workpiece. Because it has been automatically sized and located relative to certain governing edges of the plane feature 1110P2, (according to a default offset distance, for example), and according to various default parameters, a great number of the pattern locations within the sampling pattern 500C' are indicated to be classified as inoperative pattern locations because they are located off the feature (e.g. on slots or holes in the planar feature 1110P2. One pattern location is indicated as inoperative because it violates an edge offset criteria. An adjustment of the sampling pattern 500C' is described below with reference to FIG. 12.

Figure 12:
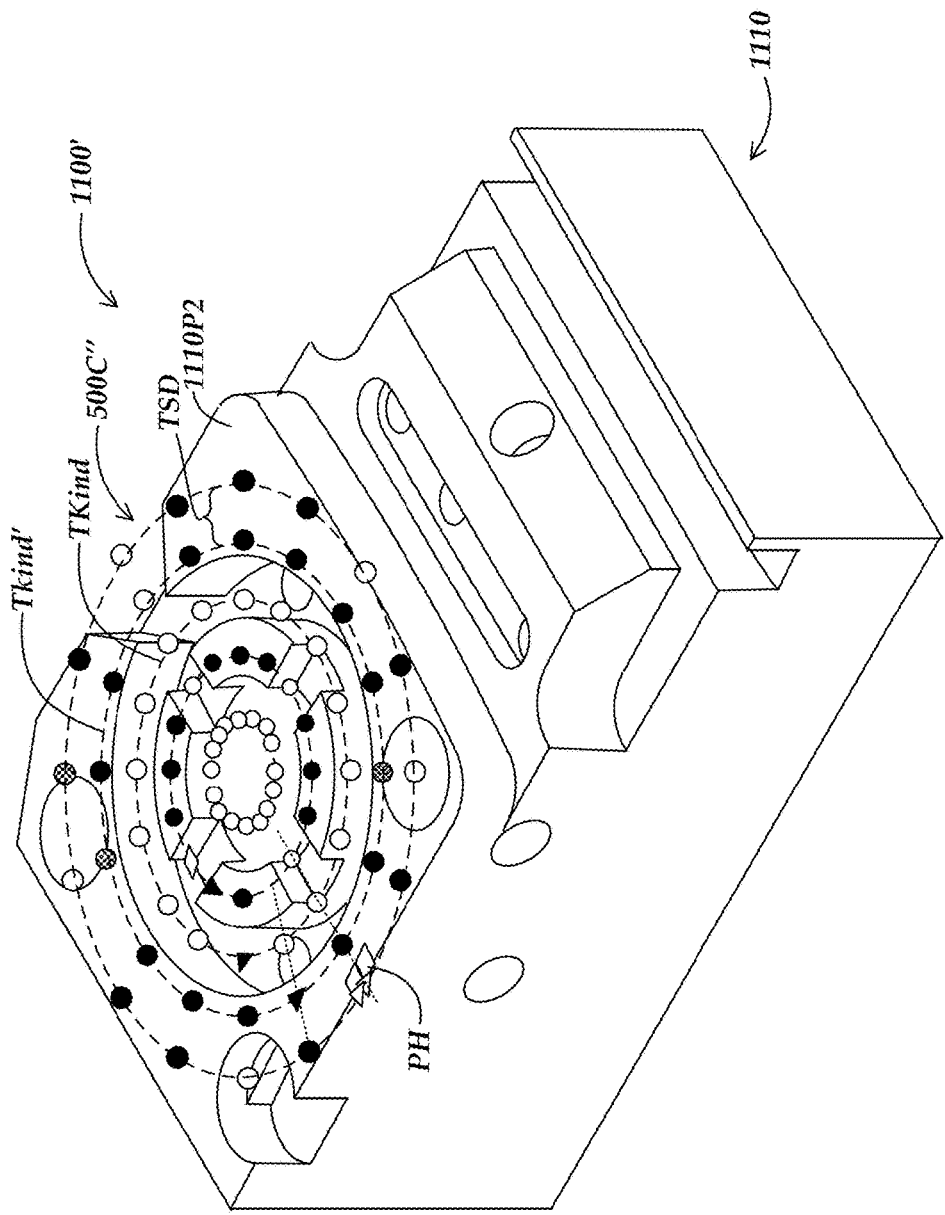
FIG. 12 shows the user interface of a programming environment shown in FIG. 11, in a second state, wherein the second planar sampling pattern has been adjusted by a user according to principles disclosed herein.

FIG. 12 is an illustration showing one embodiment of the portion of the user interface of a programming environment shown in FIG. 11, in a second state 1100'. In the illustrated example, the user interface 1100' is in a state wherein the sampling pattern 500L' has been suppressed (for clarity of illustration) and the sampling pattern 500O" has been adjusted by a user relative to the form of the sampling pattern 500C' shown in FIG. 11, in order to greatly increase the number of operative sampling pattern locations on the planar feature 1110P2. In particular, it will be understood that starting with the configuration shown in FIG. 11, the user has first dragged the track indicator TKind inward, in a manner analogous to that described with reference to FIG. 9C creating two additional phantom tracks (for a total of five tracks), within the original size or range of the sampling pattern 500C'. The user may then slightly increased the size or range, by dragging the pattern handle PH, such that the pattern locations of the track indicator TKind' do not violate the edge offset parameter criteria relative to the adjacent edge. Thus, by using only two very simple and intuitively understood graphical user interface operations according to principles disclosed herein, the user has created and/or adjusted a large number pattern sampling locations simultaneously, beginning with the inferior default sampling pattern 500C' shown in FIG. 11, and providing superior pattern sampling locations in the adjusted sampling pattern 500O", to robustly sample (measure) the planar feature 1110P2. It will be understood that this description is exemplary only and not limiting. Various other user-interface operations outlined previously may be used separately and/or in any operable combination, in order to adjust any of the various sampling patterns is disclosed herein.

Figure 13:
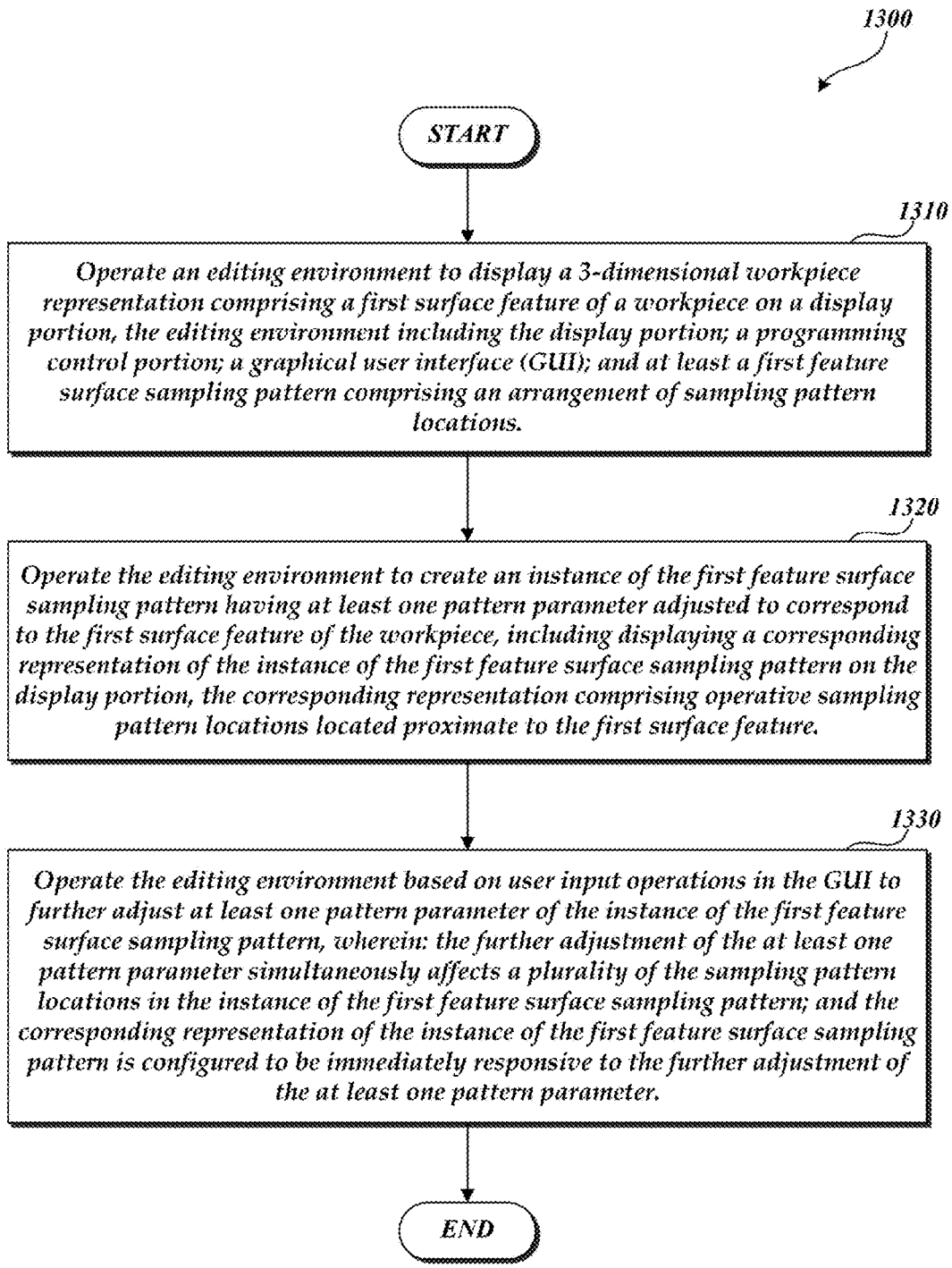
FIG. 13 is a flow diagram illustrating one example of a routine for programming workpiece feature inspection operations for a metrology system comprising a coordinate measuring machine, according to principles disclosed herein.

FIG. 13 is a flow diagram illustrating one example of a routine 1300 for programming workpiece feature inspection operations for a metrology system, according to principles disclosed herein. At a block 1310, an editing environment is operated to display a 3-dimensional workpiece representation comprising a first surface feature of a workpiece on a display portion. The editing environment includes the display portion; a programming control portion; a graphical user interface (GUI); and at least a first feature surface sampling pattern comprising an arrangement of sampling pattern locations.

At a block 1320, the editing environment is operated to create an instance of the first feature surface sampling pattern having at least one pattern parameter adjusted to correspond to the first surface feature of the workpiece. A corresponding representation of the instance of the first feature surface sampling pattern is further displayed on the display portion. The corresponding representation includes operative sampling pattern locations located proximate to the first surface feature.

At a block 1330, the editing environment is operated based on user input operations in the GUI to further adjust at least one pattern parameter of the instance of the first feature surface sampling pattern. The further adjustment of the at least one pattern parameter simultaneously affects a plurality of the sampling pattern locations in the instance of the first feature surface sampling pattern. The corresponding representation of the instance of the first feature surface sampling pattern is also configured to be immediately responsive to the further adjustment of the at least one pattern parameter.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented method for programming workpiece feature inspection operations for a coordinate measuring machine, the coordinate measuring machine comprising: a sensor used for determining workpiece feature measurement data; a stage for holding a workpiece wherein the sensor and the stage move relative to one another; and a CMM control portion, the method implemented in an editing environment comprising: a programming control portion; a display portion; a graphical user interface (GUI);

and at least a first feature surface sampling pattern comprising an arrangement of sampling pattern locations, the method comprising:

operating the editing environment to display a 3-dimensional workpiece representation comprising a first surface feature of a workpiece on the display portion;

operating the editing environment to create an instance of the first feature surface sampling pattern having at least one pattern parameter adjusted to correspond to the first surface feature of the workpiece, including displaying a corresponding representation of the instance of the first feature surface sampling pattern automatically fitted to the first surface feature, the automatically-fitted corresponding representation comprising operative sampling pattern locations and inoperative sampling pattern locations with respective appearances that distinguish them from one another;

operating the editing environment based on user input operations in the GUI to further adjust at least one pattern parameter of the instance of the first feature surface sampling pattern, wherein:

the further adjustment of the at least one pattern parameter simultaneously moves at least one of a plurality of the operative sampling pattern locations and a plurality of the inoperative sampling pattern locations in the instance of the first feature surface sampling pattern;

the corresponding representation of the instance of the first feature surface sampling pattern is configured to be immediately responsive to the further adjustment of the at least one pattern parameter; and the plurality of the inoperative sampling pattern locations, when simultaneously moved to become a plurality of operative sampling pattern locations in response to the further adjustment of the at least one pattern parameter, change their appearances to be those of the operative sampling pattern locations.

2. The computer-implemented method of claim 1, wherein the inoperative sampling pattern locations are at least one of a first type of inoperative sampling pattern location wherein a pattern location is inaccessible by a current sensor configuration on the CMM or a second type of inoperative sampling pattern location wherein a pattern location does not conform to the first surface feature.

3. The computer-implemented method of claim 2, wherein in the second type of inoperative sampling pattern location the inoperative sampling pattern location falls on a void in the first surface feature or falls outside of the first surface feature.

4. The computer-implemented method of claim 2, wherein a GUI element is provided which allows a user to select whether or not to suppress at least one type of inoperative location in the corresponding representation.

5. The computer-implemented method of claim 1, wherein the respective appearances for distinguishing the operative sampling pattern locations from the inoperative sampling pattern locations include at least one of different colors, shapes or patterns.

6. The computer-implemented method of claim 1, wherein the user input operations for adjusting the at least one pattern parameter are provided by at least one of dedicated GUI elements, touch gestures or a dialog box.

7. The computer-implemented method of claim 1, wherein the at least one pattern parameter that is adjusted is related to at least one of a density of sampling pattern locations on the surface of the workpiece, or a number of sampling pattern locations in a range, or a density of sampling pattern locations along a sampling track.

8. The computer-implemented method of claim 7, wherein a GUI element is provided which allows a user to at least one of rotate, translate or drag the instance of the first feature surface sampling pattern relative to the surface of the workpiece.

9. The computer-implemented method of claim 1, wherein the programming control portion comprises a computer and programming control routines.

10. The computer-implemented method of claim 1, wherein the instance of the first feature surface sampling pattern comprises an element having at least one of underlying programming operations or pattern control operations.

11. The computer-implemented method of claim 1, wherein the instance of the first feature surface sampling pattern comprises a graphical inspection point programming element (GIPP element).

12. The computer-implemented method of claim 11, wherein the instance of the first feature surface sampling pattern is automatically sized to and superimposed on the 3-dimensional workpiece representation when the GIPP element is moved near the 3-dimensional workpiece representation in the display portion.

13. The computer-implemented method of claim 11, wherein the instance of the first feature surface sampling pattern defines a sampling path corresponding to inspection program instructions which are automatically generated by the GIPP element.

14. The computer-implemented method of claim 13, wherein the sampling path is utilized for determining the movements of a surface point sensor as it is controlled by the coordinate measuring machine for sampling surface coordinates of the workpiece surface.

15. The computer-implemented method of claim 11, wherein the GIPP element further comprises a plurality of modes for at least one type of surface feature.

16. The computer-implemented method of claim 15, wherein the plurality of modes comprises at least three modes corresponding to at least some of a plurality of sampling tracks being in the form of circles, lines or a spiral, respectively.

17. The computer-implemented method of claim 11, wherein the first surface feature of the workpiece corresponds to at least one of a cylinder, plane, sphere or cone.

18. The computer-implemented method of claim 17, wherein the GIPP element is at least one of a cylindrical GIPP element that conforms to a cylindrical surface feature, a plane GIPP element that conforms to a planar surface feature, a sphere GIPP element that conforms to a spherical surface feature, or a cone GIPP element that conforms to a conical surface feature.

19. The computer-implemented method of claim 1, wherein the at least one pattern parameter is a sampling pattern start parameter which determines a start position of the instance of the first feature surface sampling pattern.

20. The computer-implemented method of claim 1, wherein the at least one pattern parameter is a sampling pattern first-direction path range parameter which determines a first-direction path range for the instance of the first feature surface sampling pattern.

21. The computer-implemented method of claim 20, wherein a second pattern parameter is a sampling pattern second-direction path range parameter which determines a second-direction path range for the instance of the first feature surface sampling pattern.

22. The computer-implemented method of claim 21, wherein the sampling pattern first-direction path range parameter is represented at the end of a first vector, and the sampling pattern second-direction path range parameter is represented at the end of a second vector, wherein a user can adjust the sampling pattern first-direction and second-direction path range parameters to adjust the sizes of the vectors and the corresponding first and second-direction path ranges for the instance of the first feature surface sampling pattern.

23. The computer-implemented method of claim 22, wherein the second vector is an arc for which the length corresponds to a central angle of the arc and the first surface feature of the workpiece corresponds to at least one of a cylinder, sphere or cone.

24. The computer-implemented method of claim 22, wherein the second vector is a line and the first surface feature of the workpiece corresponds to a plane.

25. The computer-implemented method of claim 20, wherein the sampling pattern first-direction path range parameter determines the length of at least some of a plurality of sampling tracks.

26. The computer-implemented method of claim 25, wherein a sampling pattern second-direction path range parameter determines a track spacing between at least some of the plurality of sampling tracks.

27. The computer-implemented method of claim 25, wherein the pattern parameters further include a sampling pattern number of sampling locations per sampling track parameter which determines a number of sampling locations per sampling track for at least some of the plurality of sampling tracks.

28. The computer-implemented method of claim 27, wherein the sampling pattern number of sampling locations per sampling track parameter is represented as a first sampling location out of a plurality of evenly spaced sampling locations that appear on a first sampling track, wherein a user can graphically adjust the location of the first sampling location on the first sampling track so as to adjust the spacing and number of sampling locations that appear on at least some of the plurality of sampling tracks.

29. The computer-implemented method of claim 25, wherein at least some of the plurality of sampling tracks lie along a continuous path, wherein each sampling track includes at least one sampling location.

30. The computer-implemented method of claim 25, wherein at least some of the plurality of sampling tracks are discrete, wherein each sampling track includes at least one sampling location.

31. The computer-implemented method of claim 25, wherein at least some of the plurality of sampling tracks each cover a 360 degree path, wherein each sampling track includes at least one sampling location.

32. A system for programming workpiece feature inspection operations for a coordinate measuring machine, the system comprising:
an editing environment, comprising: a programming control portion; a display portion; a graphical user interface (GUI); and at least a first feature surface sampling pattern comprising an arrangement of sampling pattern locations;
a memory for storing programmed instructions; and
a processor configured to execute the programmed instructions to perform operations including:
operating the editing environment to display a 3-dimensional workpiece representation comprising a first surface feature of a workpiece on a display portion;
operating the editing environment to create an instance of a first feature surface sampling pattern comprising an arrangement of sampling pattern locations and having at least one pattern parameter adjusted to correspond to the first surface feature of the workpiece, including displaying a corresponding representation of the instance of the first feature surface sampling pattern automatically fitted to the first surface feature, the automatically-fitted corresponding representation comprising operative sampling pattern locations and inoperative sampling pattern locations with respective appearances that distinguish them from one another;
operating the editing environment based on user input operations in the GUI to further adjust at least one pattern parameter of the instance of the first feature surface sampling pattern, wherein:
the further adjustment of the at least one pattern parameter simultaneously moves at least one of a plurality of the operative sampling pattern locations and a plurality of the inoperative sampling pattern locations in the instance of the first feature surface sampling pattern;
the corresponding representation of the instance of the first feature surface sampling pattern is configured to be immediately responsive to the further adjustment of the at least one pattern parameter; and
the plurality of the inoperative sampling pattern locations, when simultaneously moved to become a plurality of operative sampling pattern locations in response to the further adjustment of the at least one pattern parameter, change their appearances to be those of the operative sampling pattern locations.

33. A non-transitory computer readable storage medium with instructions stored thereon that, when executed by a computing system, cause the computing system to perform a method for programming workpiece feature inspection operations for a coordinate measuring machine, the method implemented in an editing environment comprising: a programming control portion; a display portion; a graphical user interface (GUI); and at least a first feature surface sampling pattern comprising an arrangement of sampling pattern locations, the method comprising:
operating the editing environment to display a 3-dimensional workpiece representation comprising a first surface feature of a workpiece on the display portion;
operating the editing environment to create an instance of the first feature surface sampling pattern having at least one pattern parameter adjusted to correspond to the first surface feature of the workpiece, including displaying a corresponding representation of the instance of the first feature surface sampling pattern automatically fitted to the first surface feature, the automatically-fitted corresponding representation comprising operative sampling pattern locations and inoperative sampling pattern locations with respective appearances that distinguish them from one another;
operating the editing environment based on user input operations in the GUI to further adjust at least one pattern parameter of the instance of the first feature surface sampling pattern, wherein:
the further adjustment of the at least one pattern parameter simultaneously moves at least one of a plurality of the operative sampling pattern locations and a plurality of the inoperative sampling pattern locations in the instance of the first feature surface sampling pattern;

the corresponding representation of the instance of the first feature surface sampling pattern is configured to be immediately responsive to the further adjustment of the at least one pattern parameter; and the plurality of the inoperative sampling pattern locations, when simultaneously moved to become a plurality of operative sampling pattern locations in response the further adjustment of the at least one pattern parameter, change their appearances to be those of the operative sampling pattern locations.

* * * * *

UNITED STATES PATENT AND TRADEMARK OFFICE
CERTIFICATE OF CORRECTION

PATENT NO. : 9,639,083 B2
APPLICATION NO. : 14/133120
DATED : May 2, 2017
INVENTOR(S) : Eric Yeh-Wei Tseo et al.

It is certified that error appears in the above-identified patent and that said Letters Patent is hereby corrected as shown below:

On the Title Page

Item (73):
"Mitutoyo Corporation, Kanagawa-ken (JP)" should read, --Mitutoyo Corporation, Kanagawa-ken (JP); Mitutoyo Europe GmbH, Neuss (DE)--.

Signed and Sealed this
Twenty-second Day of December, 2020

Andrei Iancu
*Director of the United States Patent and Trademark Office*